(12) United States Patent
Wang et al.

(10) Patent No.: US 7,775,027 B2
(45) Date of Patent: Aug. 17, 2010

(54) QUICK SWITCHING MECHANISM FOR SIDE DISCHARGE UNIT AND GRASS CHOPPER UNIT OF A LAWN MOWER

(75) Inventors: Ting Wang, Jiangsu (CN); Chaojie Zhang, Jiangsu (CN); Shengli Wang, Jiangsu (CN); Wenchen Song, Jiangsu (CN)

(73) Assignee: Jiangsu World Plant-Protecting Machinery Co., Ltd., Danyang, Jiangsu (CN)

( * ) Notice: Subject to any disclaimer, the term of this patent is extended or adjusted under 35 U.S.C. 154(b) by 0 days.

(21) Appl. No.: 12/482,258

(22) Filed: Jun. 10, 2009

(65) Prior Publication Data

US 2009/0308043 A1    Dec. 17, 2009

(30) Foreign Application Priority Data

Jun. 11, 2008    (CN) .................... 2008 2 0037527 U

(51) Int. Cl.
    A01D 67/00    (2006.01)
(52) U.S. Cl. .................................................... 56/320.2
(58) Field of Classification Search ............... 56/320.2, 56/17.5, 320.1, DIG. 24, 202, 17.4
See application file for complete search history.

(56) References Cited

U.S. PATENT DOCUMENTS

| | | | | | |
|---|---|---|---|---|---|
| 2,578,880 | A | * | 12/1951 | Doyle | 56/17.2 |
| 3,192,692 | A | * | 7/1965 | Slemmons | 56/13.4 |
| 3,404,519 | A | * | 10/1968 | Demers | 56/14.7 |
| 3,496,707 | A | * | 2/1970 | Kobey | 56/17.5 |
| 3,805,499 | A | * | 4/1974 | Woelffer et al. | 56/202 |
| 4,008,559 | A | * | 2/1977 | Lessig | 56/320.2 |
| 4,466,235 | A | * | 8/1984 | Cole | 56/16.9 |
| 4,854,115 | A | * | 8/1989 | Jones et al. | 56/320.1 |
| 5,040,364 | A | * | 8/1991 | Deegan | 56/320.2 |
| 5,133,175 | A | * | 7/1992 | Dumbrell | 56/17.4 |
| 5,249,411 | A | * | 10/1993 | Hake | 56/11.6 |
| 5,491,964 | A | * | 2/1996 | Butler | 56/320.2 |
| 5,826,417 | A | * | 10/1998 | Evans | 56/320.2 |

(Continued)

*Primary Examiner*—Árpád Fábián-Kovács
(74) *Attorney, Agent, or Firm*—Miller, Matthias & Hull

(57) ABSTRACT

The present disclosed invention relates to a quick switching mechanism for the side discharge unit and the chopper unit of a lawn mower: a side discharge unit and a chopper unit are mounted at the grass outlet on a cutting platform; wherein, the side discharge unit comprises a grass discharging gear shaft, a grass discharging hood mounted on the grass discharging gear shaft; the grass chopper unit comprises a grass chopping gear shaft, a grass chopping closing plate mounted on the grass chopping gear shaft; the small gear on the grass discharging gear shaft is engaged to the big gear on the grass chopping gear shaft; a guy wire is mounted on the cutting platform, and is connected to a rotary arm mounted on one end of the grass chopping gear shaft. In the invention, the current grass discharging hood is kept, and therefore the safety of grass discharging is not compromised; during the mowing process, when the mower runs into a place (e.g., a kerb, shrub, etc.) where the grass discharging process is difficult, the mower can be switched from grass discharging mode to grass chopping mode immediately; after the mower passes the place, it can be switched back to grass discharging mode quickly; if the mower runs into a narrow place (e.g., the space between two trees), the mower can be switching from wide discharging mode to narrow discharging mode immediately; the mower can be switched back quickly after it passes through the place.

2 Claims, 1 Drawing Sheet

U.S. PATENT DOCUMENTS

| | | | |
|---|---|---|---|
| 6,189,406 B1 * | 2/2001 | Kapes et al. | 74/500.5 |
| 6,854,253 B2 * | 2/2005 | Dickey | 56/320.2 |
| 6,857,256 B2 * | 2/2005 | Strange et al. | 56/320.2 |
| 6,874,309 B1 * | 4/2005 | Bellis, Jr. | 56/320.2 |
| 6,910,322 B2 * | 6/2005 | Schroeder et al. | 56/202 |
| 7,185,479 B1 * | 3/2007 | Cartner | 56/320.1 |
| 7,313,902 B1 * | 1/2008 | Eavenson et al. | 56/13.6 |
| 7,337,602 B1 * | 3/2008 | Butler et al. | 56/320.2 |
| 7,448,195 B2 * | 11/2008 | Kohler | 56/320.2 |
| 7,594,379 B2 * | 9/2009 | Nicholson et al. | 56/320.2 |
| 2008/0134654 A1 * | 6/2008 | Kohler | 56/320.2 |

* cited by examiner

QUICK SWITCHING MECHANISM FOR SIDE DISCHARGE UNIT AND GRASS CHOPPER UNIT OF A LAWN MOWER

CROSS-REFERENCE TO RELATED APPLICATIONS

This U.S. patent application claims priority under the Paris Convention to Chinese Patent Application No. CN 200820037527.1, filed on Jun. 11, 2008.

FIELD OF THE DISCLOSURE

The present invention relates to a lawn mower, particularly to a side discharge unit and grass chopper unit of a lawn mower.

BACKGROUND OF THE DISCLOSURE

Single-blade and multi-blade lawn mowers are available in the current market, and these lawn mowers usually have side discharging and grass chopping functions. During the side grass discharging process, a discharging hood is mounted on the grass outlet to control the flow direction of the grass scraps and provide safety protection; during the grass chopping process, a closing plate is mounted on the grass outlet, to prevent the grass scraps from discharging out. However, such a structure has the following drawbacks: 1. Since the grass discharging hood and the grass chopping closing plate have to be mounted separately, appropriate tools (e.g., a wrench) are required when switching between the grass discharging and the grass chopping happens, and the switching operation is inconvenient. 2. After the grass discharging hood is mounted, the width of the entire lawn mower is increased, and therefore it is adverse for the mower to move through narrow places.

At present, a method for solving the above technical problems is: a rotary grass chopping closing plate can be mounted on the current lawn mower, so that the quick switching between the side grass discharging and the grass chopping can be achieved by rotating the grass chopping closing plate. However, such structure can't provide grass discharging hood, thus there is no safety protection in the grass discharging direction during side grass discharging process.

SUMMARY OF THE DISCLOSURE

The object of the present invention is to overcome the drawbacks in the prior art and provide a quick switching mechanism for switching between the side discharge unit and the chopper unit of a lawn mower, which can achieve quick switching between the side grass discharging function and the grass chopping function, without compromising the performance and safety of the lawn mower.

The technical scheme employed in the invention is: a side discharge unit and a chopper unit are mounted at the grass outlet on a cutting platform; wherein, the side discharge unit comprises a grass discharging gear shaft, a grass discharging hood mounted on the grass discharging gear shaft; the grass chopper unit comprises a grass chopping gear shaft, a grass chopping closing plate mounted on the grass chopping gear shaft; the small gear on the grass discharging gear shaft is engaged to the big gear on the grass chopping gear shaft; a guy wire is mounted on the cutting platform, and is connected to a rotary arm mounted on one end of the grass chopping gear shaft.

In the invention, the current grass discharging hood is reserved, and therefore the safety of grass discharging is not compromised; during the mowing process, when the mower runs into a place (e.g., a kerb, shrub, etc.) where the grass discharging process is difficult to perform, the mower can be switched from the grass discharging mode to the grass chopping mode immediately; after the mower passes the place, it can be switched back to the grass discharging mode immediately; if the mower runs into a narrow place (e.g., the space between two trees), the mower can be switching from wide discharging mode to narrow discharging mode immediately; the mower can be switched back immediately after it passes through the place.

BRIEF DESCRIPTION OF THE DRAWINGS

Hereafter the invention will be further detailed descripted in the embodiments, with reference to the accompany drawings.

Figure 1:
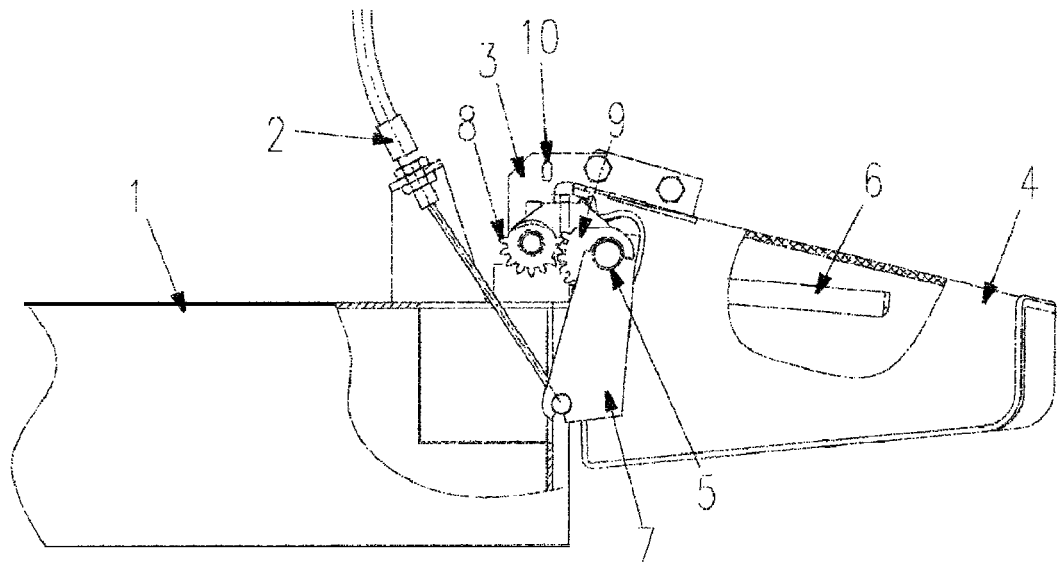
FIG. 1 is a structural diagram of the invention in side discharging state.

Wherein, in the drawings: 1. cutting platform; 2. guy wire; 3. grass discharging gear shaft; 4. grass discharging hood; 5. grass chopping gear shaft; 6. grass chopping closing plate; 7. rotary arm; 8. small gear; 9. big gear; 10. torsion spring.

DETAILED DESCRIPTION OF THE DISCLOSURE

Figure 2:
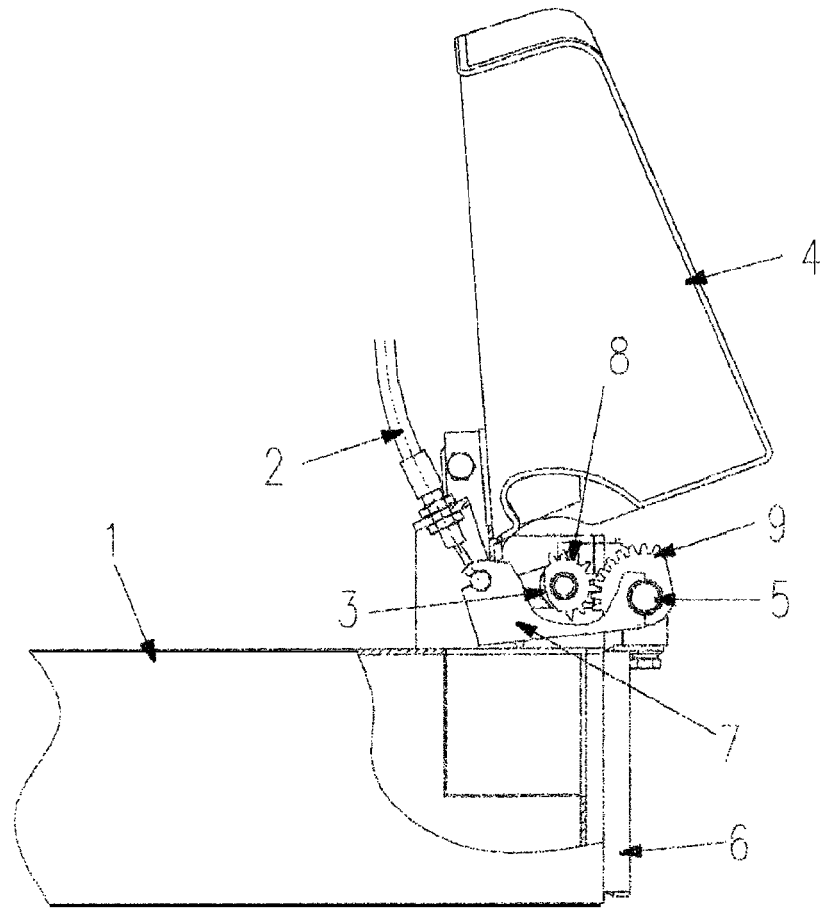
FIG. 2 is a structural diagram of the invention in grass chopping state.

As shown in FIG. 1 and FIG. 2, in this invention, the interaction between a grass discharging hood 4 and a grass chopping closing plate 6 is achieved with a pair of gear shafts (grass discharging gear shaft 3 and grass chopping gear shaft 5), by means of the engagement between the small gear 8 on the grass discharging gear shaft 3 and the big gear 9 on the grass chopping gear shaft 5. The control mechanism of the mower has two positions, which match the side discharging state shown in FIG. 1 and the grass chopping state shown in FIG. 2. In addition, the control mechanism can be positively stopped in the grass chopping position. A side discharge unit and a chopper unit are mounted at the grass outlet on a cutting platform 1; wherein, the side discharge unit comprises a grass discharging gear shaft 3, a grass discharging hood 4 mounted on the grass discharging gear shaft 3; the grass chopper unit comprises a grass chopping gear shaft 5, a grass chopping closing plate 6 mounted on the grass chopping gear shaft 5; the small gear 8 on the grass discharging gear shaft 3 is engaged to the big gear 9 on the grass chopping gear shaft 5; a guy wire 2 is mounted on the cutting platform 1, and is connected to a rotary arm 7 mounted on one end of the grass chopping gear shaft 5, and the other end of the guy wire 2 is connected to the control mechanism of the mower. A torsion spring 10 is mounted on the grass discharging gear shaft 3; under the force of the torsion spring 10, the grass discharging gear shaft 3 always afford a torque in clockwise direction.

When this invention is performed, the control mechanism of the mower in the invention is switched to from the grass discharging position to the grass chopping position, the control mechanism pulls the rotary arm 7 on the grass chopping gear shaft 5 in the help of the guy wire 2, so that the grass chopping gear shaft 5 rotates in clockwise direction, and drives the grass chopping closing plate 6 to rotate downwards to the grass chopping state. Meanwhile, by means of the engagement between the small gear 8 and the big gear 9, the grass chopping gear shaft 3 is driven to overcome the spring torque to rotate in counter clockwise direction, and the grass discharging gear shaft 3 drives the grass discharging hood 4 to rotate to the grass chopping position (as shown in FIG. 2), so as to achieve grass chopping function.

When the control mechanism departs from the positive stop mechanism in the grass chopping position, the grass discharging gear shaft 3 rotates in clockwise direction under the spring torque, and drives the grass discharging hood 4 to rotate downwards to the grass discharging position, and, by means of the engagement between the small gear 8 and the big gear 9, drives the grass chopping gear shaft 5 to rotate in counter clockwise direction, so that the grass chopping gear shaft 5 drives the grass chopping closing plate 6 to rotate upwards to the grass discharging state. At the same time, the rotary arm 7 on the grass chopping gear shaft 5 pulls the guy wire 2, and to return the control mechanism to grass discharging position in the help of the guy wire 2 (as shown in FIG. 1), so as to achieve the side grass discharging function.

The invention claimed is:

1. A quick switching mechanism for the side discharge unit and grass chopper unit of a lawn mower, comprising: a side discharge unit and a grass chopper unit are mounted at the grass outlet of a cutting platform, wherein, the side discharge unit comprises a grass discharging gear shaft and a grass discharging hood mounted on the grass discharging gear shaft); the grass chopper unit comprises a grass chopping gear shaft and a grass chopping closing plate mounted on the grass chopping gear shaft; a small gear on the grass discharging gear shaft is engaged with a big gear on the grass chopping gear shaft, a guy wire is mounted on the cutting platform, and is connected to a rotary arm on one end of the grass chopping gear shaft.

2. The quick switching mechanism for the side discharge unit and the grass chopper unit of a lawn mower according to claim 1, wherein, a torsion spring is mounted on the grass discharging gear shaft, and the rotary arm fixed to the grass chopping gear shaft is connected with the guy wire.

\* \* \* \* \*